US011009097B2

(12) United States Patent
Rawlings et al.

(10) Patent No.: US 11,009,097 B2
(45) Date of Patent: May 18, 2021

(54) HYDRAULIC MOUNT HAVING FLUID-TRACK

(71) Applicant: The Pullman Company, Milan, OH (US)

(72) Inventors: Scott W. Rawlings, North Ridgeville, OH (US); Donald E. Schank, Bellevue, OH (US); Zoren E. Gaspar, Huron, OH (US)

(73) Assignee: The Pullman Company, Milan, OH (US)

( * ) Notice: Subject to any disclaimer, the term of this patent is extended or adjusted under 35 U.S.C. 154(b) by 104 days.

(21) Appl. No.: 16/263,410

(22) Filed: Jan. 31, 2019

(65) Prior Publication Data
US 2020/0248777 A1 Aug. 6, 2020

(51) Int. Cl.
*F16F 13/10* (2006.01)
*F16F 13/22* (2006.01)

(52) U.S. Cl.
CPC ............ *F16F 13/105* (2013.01); *F16F 13/22* (2013.01); *F16F 2222/12* (2013.01); *F16F 2230/30* (2013.01); *F16F 2236/12* (2013.01)

(58) Field of Classification Search
CPC .......... F16F 13/105; F16F 13/22; F16F 13/16; F16F 13/08; F16F 13/1463; F16F 15/022;
(Continued)

(56) References Cited

U.S. PATENT DOCUMENTS 4,418,897 A 12/1983 Hartel et al.
4,759,534 A 7/1988 Hartel
(Continued)

FOREIGN PATENT DOCUMENTS

DE 19632098 A1 2/1997
EP 2706257 A2 3/2014
(Continued)

OTHER PUBLICATIONS

International Search Report and Written Opinion for Application No. PCT/US2020/015219 dated May 26, 2020.

*Primary Examiner* — Pamela Rodriguez
(74) *Attorney, Agent, or Firm* — Harness, Dickey & Pierce, P.L.C.

(57) ABSTRACT

A hydraulic mount includes an inner tubular assembly, first and second elastomeric bodies and a fluid-track. The first and second elastomeric bodies are attached to the inner tubular assembly and cooperate to define a first fluid chamber. The second elastomeric body also defines a second fluid chamber that is in fluid communication with the first fluid chamber via the fluid-track. The fluid-track is attached to the inner tubular assembly partially disposed in the first fluid chamber. The fluid-track includes a central portion, a peripheral portion and a passage. The peripheral portion extends radially outwardly from a periphery of the central portion. The passage provides fluid communication between the first and second fluid chambers. Gaps are positioned between the peripheral portion and a wall of one of the first and second elastomeric bodies. The peripheral portion being configured to contact the wall during loading of the inner tubular assembly to restrict movement of the inner tubular assembly and the fluid-track.

19 Claims, 7 Drawing Sheets

(58) Field of Classification Search
CPC . F16F 2236/12; F16F 2230/30; F16F 2222/12
See application file for complete search history.

(56) References Cited

U.S. PATENT DOCUMENTS

| | | | |
|---|---|---|---|
| 4,936,556 A | 6/1990 | Makibayashi et al. |
| 5,005,810 A | 4/1991 | Sawada et al. |
| 5,232,209 A | 8/1993 | de Fontenay et al. |
| 5,498,060 A | 3/1996 | Satomi |
| 5,690,320 A | 11/1997 | Kanda |
| 6,981,696 B2 | 1/2006 | Hatano et al. |
| 7,044,455 B2 | 5/2006 | Yoshida et al. |
| 7,413,050 B2 | 8/2008 | Miyagawa et al. |
| 7,584,944 B2 | 9/2009 | Goudie |
| 8,091,871 B2 | 1/2012 | Bradshaw et al. |
| 8,177,201 B2 | 5/2012 | Goudie |
| 9,038,997 B2 | 5/2015 | Bradshaw et al. |
| 9,097,310 B2 | 8/2015 | Gaspar |
| 9,163,695 B2 | 10/2015 | Saito et al. |
| 9,441,704 B2 | 9/2016 | Gaspar et al. |
| 9,765,845 B2 | 9/2017 | Bradshaw et al. |
| 9,850,977 B2 | 12/2017 | Gaspar et al. |
| 2004/0135299 A1 | 7/2004 | Kuwayama |
| 2006/0261531 A1 | 11/2006 | Kim |
| 2008/0018031 A1 | 1/2008 | Goudie |
| 2011/0210489 A1 | 9/2011 | Bradshaw et al. |
| 2013/0015614 A1 | 1/2013 | Bradshaw et al. |
| 2013/0038006 A1 | 2/2013 | Saito et al. |
| 2013/0069288 A1 | 3/2013 | Saito et al. |
| 2014/0327198 A1* | 11/2014 | Preikszas | F16F 13/107 267/140.13 |
| 2016/0003322 A1 | 1/2016 | Bradshaw et al. |

FOREIGN PATENT DOCUMENTS

| | | |
|---|---|---|
| JP | 2004211765 A | 7/2004 |
| KR | 1020070111158 | 3/2008 |

* cited by examiner

HYDRAULIC MOUNT HAVING FLUID-TRACK

FIELD

The present disclosure relates to a hydraulic mount having a fluid-track.

BACKGROUND

This section provides background information related to the present disclosure and is not necessarily prior art.

Damping mounts are commonly used to couple two components of a vehicle while damping vibrations between the components. Damping mounts may be utilized for automotive engine mounts, sub-frame mounts, and body mounts, for example.

To limit the vibrational movement between two components, damping mounts may include two separate mount assemblies. A damping mount may, for example, include an elastomeric mount member and a hydraulic mount member. The elastomeric mount member may be disposed between two components of the vehicle. The hydraulic mount member may be coupled with the elastomeric mount member such that one of the components is disposed therebetween. The elastomeric mount member absorbs vibrations between the first component and the second component. Furthermore, the elastomeric mount member may exert a load onto the hydraulic mount member which transfers fluid between two chambers to dampen vibrations of the components.

SUMMARY

This section provides a general summary of the disclosure, and is not a comprehensive disclosure of its full scope or all of its features.

In one form, the present disclosure may provide a hydraulic mount for coupling a first vehicle component and a second vehicle component. The mount includes an inner tubular assembly, a first elastomeric body, a second elastomeric body and a fluid-track. The first and second elastomeric bodies are attached to the inner tubular assembly and cooperate with each other to define a first fluid chamber. The second elastomer body also defines a second fluid chamber that is in fluid communication with the first fluid chamber. The fluid-track is attached to the inner tubular assembly and is disposed at least partially in the first fluid chamber. The fluid-track includes a central portion, a peripheral portion and a passage. The peripheral portion extends around and radially outwardly from a periphery of the central portion. The passage provides fluid communication between the first and second fluid chambers. Gaps are positioned between the peripheral portion and a wall of one of the first and second elastomeric bodies. The peripheral portion being configured to contact the wall during loading of the inner tubular assembly to restrict movement of the inner tubular assembly and the fluid-track.

In some configurations of the mount of the above paragraph, the peripheral portion includes a first set of opposing side walls and a second set of opposing side walls. The first set of opposing side walls extends radially outwardly further than the second set of opposing side walls.

In some configurations of the mount in any one or more of the above paragraphs, the load of the inner tubular assembly is a radial load. One of the side walls of the first set of opposing side walls are configured to contact the wall of the second elastomeric body during the radial load to restrict movement of the inner tubular assembly and the fluid-track in a radial direction.

In some configurations of the mount in any one or more of the above paragraphs, the first set of opposing side walls are curved and the second set of opposing side walls are straight.

In some configurations of the mount in any one or more of the above paragraphs, the wall is an inner wall of the second elastomeric body. The gaps are positioned between the first set of opposing walls and the inner wall of the second elastomeric body.

In some configurations of the mount in any one or more of the above paragraphs, the peripheral portion includes a pair of elongated protrusions extending upwardly from a surface of the peripheral portion at opposing sides thereof.

In some configurations of the mount in any one or more of the above paragraphs, the pair of elongated protrusions extend along the opposing sides of the peripheral portion and adjacent respective side walls of the first set of opposing side walls.

In some configurations of the mount in any one or more of the above paragraphs, the wall is an upper wall of the first elastomeric body. The gaps are positioned between the pair of elongated protrusions and the upper wall of the first elastomeric body.

In some configurations of the mount in any one or more of the above paragraphs, the load of the inner tubular assembly is an axial load. The pair of elongated protrusions are configured to contact the upper wall of the first elastomeric body during the axial load to restrict movement of the inner tubular assembly and the fluid-track in an axial direction.

In some configurations of the mount in any one or more of the above paragraphs, the central portion includes an opening that has an inner surface. The passage is formed adjacent the inner surface.

In some configurations of the mount in any one or more of the above paragraphs, the fluid-track is made of a polymeric material.

In another form, the present disclosure may provide a hydraulic mount for coupling a first vehicle component and a second vehicle component. The mount may include an inner tubular assembly, a first elastomeric body, a second elastomeric body and a fluid-track. The first and second elastomeric bodies are attached to the inner tubular assembly and cooperate with each other to define a first fluid chamber. The second elastomeric body also defines a second fluid chamber that is in fluid communication with the first fluid chamber. The fluid-track is disposed at least partially in the first fluid chamber and includes a central portion and a peripheral portion. The central portion includes an opening that receives the inner tubular assembly. The peripheral portion extends radially outwardly from a periphery of the central portion. The central portion includes a passage that provides fluid communication between the first and second fluid chambers.

In some configurations of the mount of the above paragraph, the inner tubular assembly includes a post and an inner ring. The inner ring is attached to an end of the post and the fluid-track is attached to an end of the inner ring.

In some configurations of the mount in any one or more of the above paragraphs, the ends of the post and the inner ring, respectively, are flared to strengthen the attachment between the post and the inner ring.

In some configurations of the mount in any one or more of the above paragraphs, the opening includes a first inner surface and a second inner surface. The first inner surface contacts the end of the inner ring and the second inner surface engages a portion of the second elastomeric body positioned between it and the end of the inner ring.

In some configurations of the mount in any one or more of the above paragraphs, the fluid-track includes a flexible catch that extends downwardly from the central portion and through first and second openings formed in the inner ring and the second elastomeric body, respectively. The flexible catch snaps into engagement with the second elastomeric body.

In some configurations of the mount in any one or more of the above paragraphs, gaps are positioned between the peripheral portion and a wall of one of the first and second elastomeric bodies. The peripheral portion is configured to contact the wall during loading of the inner tubular assembly to restrict movement of the inner tubular assembly and the fluid-track.

In some configurations of the mount in any one or more of the above paragraphs, the fluid-track is made of a polymeric material.

In yet another form, the present disclosures provides a method including molding a first elastomeric body around an inner tubular member; molding a second elastomeric body around an inner ring and a post; attaching an asymmetrical fluid-track to the inner ring; attaching the inner tubular member to the post to couple the first and second elastomeric bodies; press-fitting an outer housing onto the first and second elastomeric bodies; and press-fitting the outer housing into a vehicle component. The first and second elastomeric bodies cooperate to define a first fluid chamber. The second elastomeric body also defines a second fluid chamber that is in fluid communication with the first fluid chamber via the asymmetrical fluid-track. At least one of the first and second elastomeric bodies includes a lug to facilitate orientation of the asymmetrical fluid-track relative to the vehicle component prior to press-fitting the outer housing into the vehicle component.

In some configurations of the method of the above paragraph, attaching the fluid-track to the inner ring includes press-fitting the fluid-track onto the inner ring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
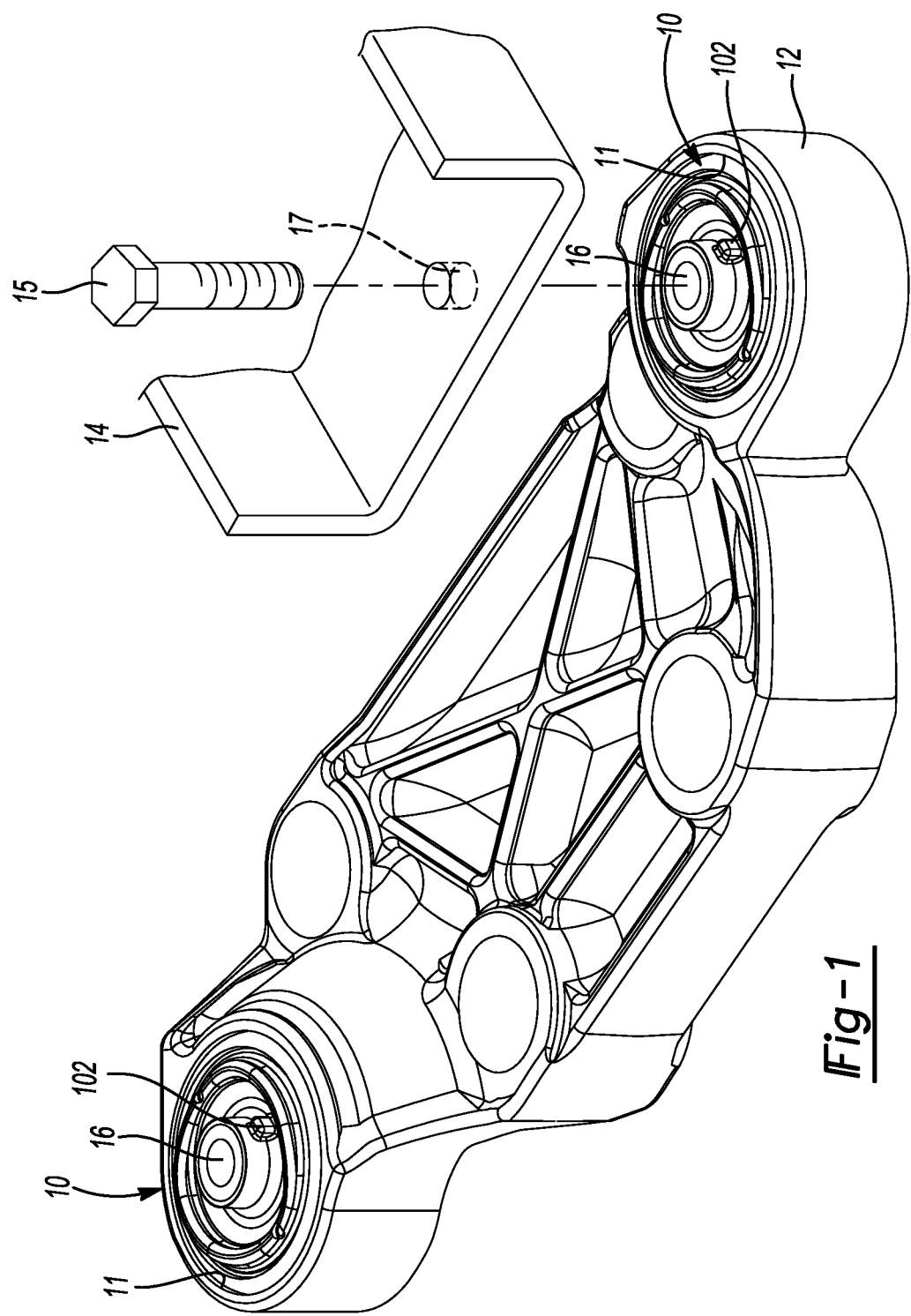
FIG. 1 is a perspective view of hydraulic mounts disposed between vehicle components according to the principles of the present disclosure.
Figure 2:
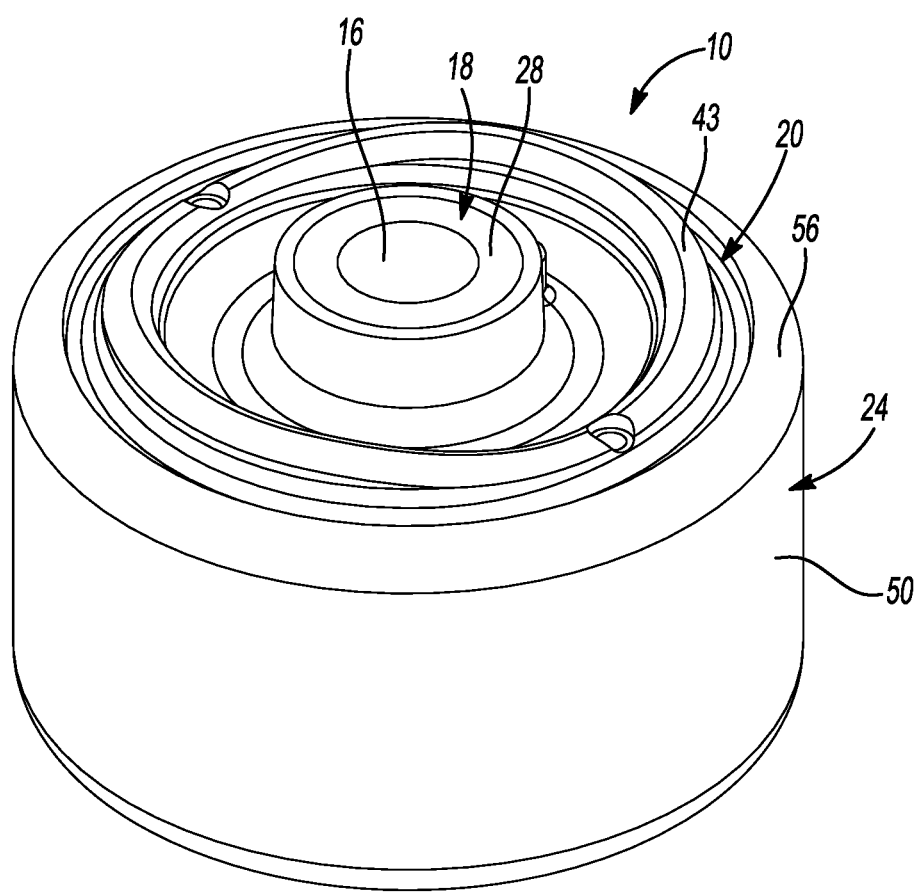
FIG. 2 is a perspective view of the hydraulic mount of FIG. 1.

Example embodiments will now be described more fully with reference to the accompanying drawings.

With reference to FIGS. 1-6, a plurality of hydraulic mounts 10 are provided. The hydraulic mounts 10 may be press-fit into respective openings 11 of a first vehicle component 12 (e.g., sub-assembly, arm, etc.) at opposing ends thereof. The first vehicle component 12 may be coupled to a second vehicle component 14 via at least one of the hydraulic mounts 10. That is, a fastener 15 may extend through an opening 16 of a respective hydraulic mount 10 and an opening 17 of the second vehicle component 14. Another fastener such as a nut (not shown) may be positioned on an opposite side of the hydraulic mount 10 and engaged with the fastener 15 to couple the first vehicle component 12 to the second vehicle component 14. The hydraulic mounts 10 may dampen vibrations of the first and second vehicle components 12, 14.

Figure 3:
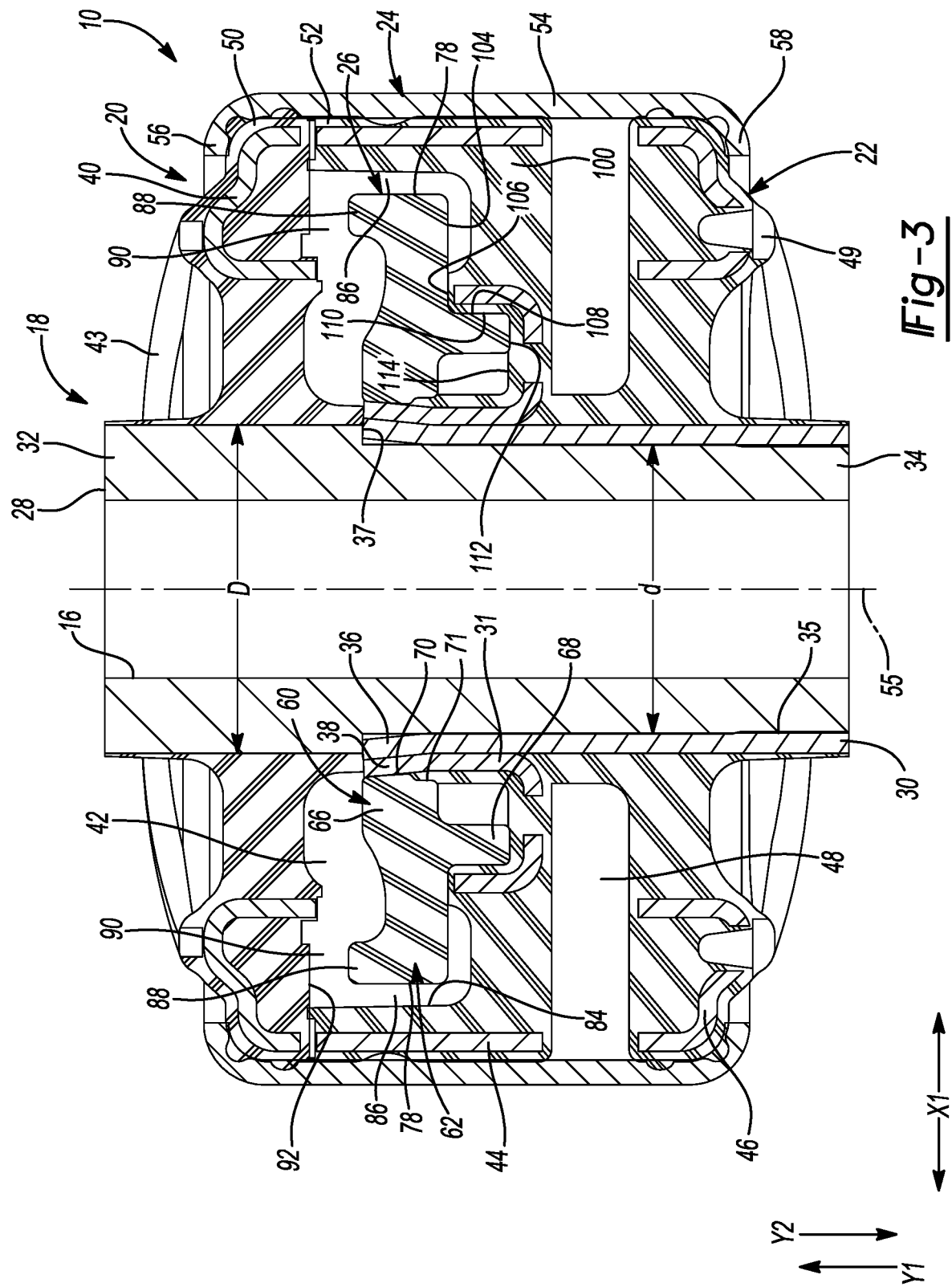
FIG. 3 is a cross-sectional view of the hydraulic mount of FIG. 2.
Figure 4:
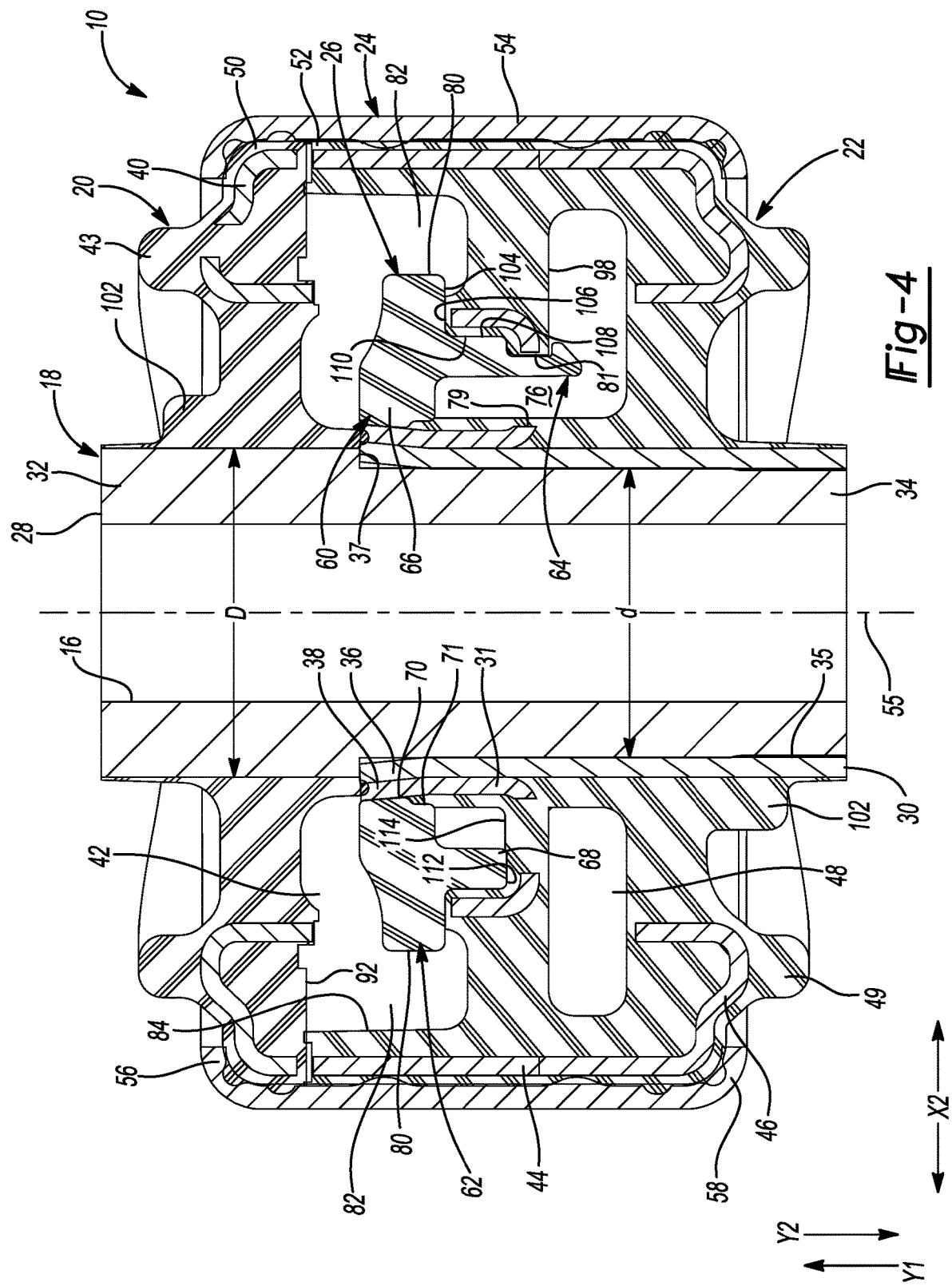
FIG. 4 is another cross-sectional view of the hydraulic mount of FIG. 2.
Figure 5:
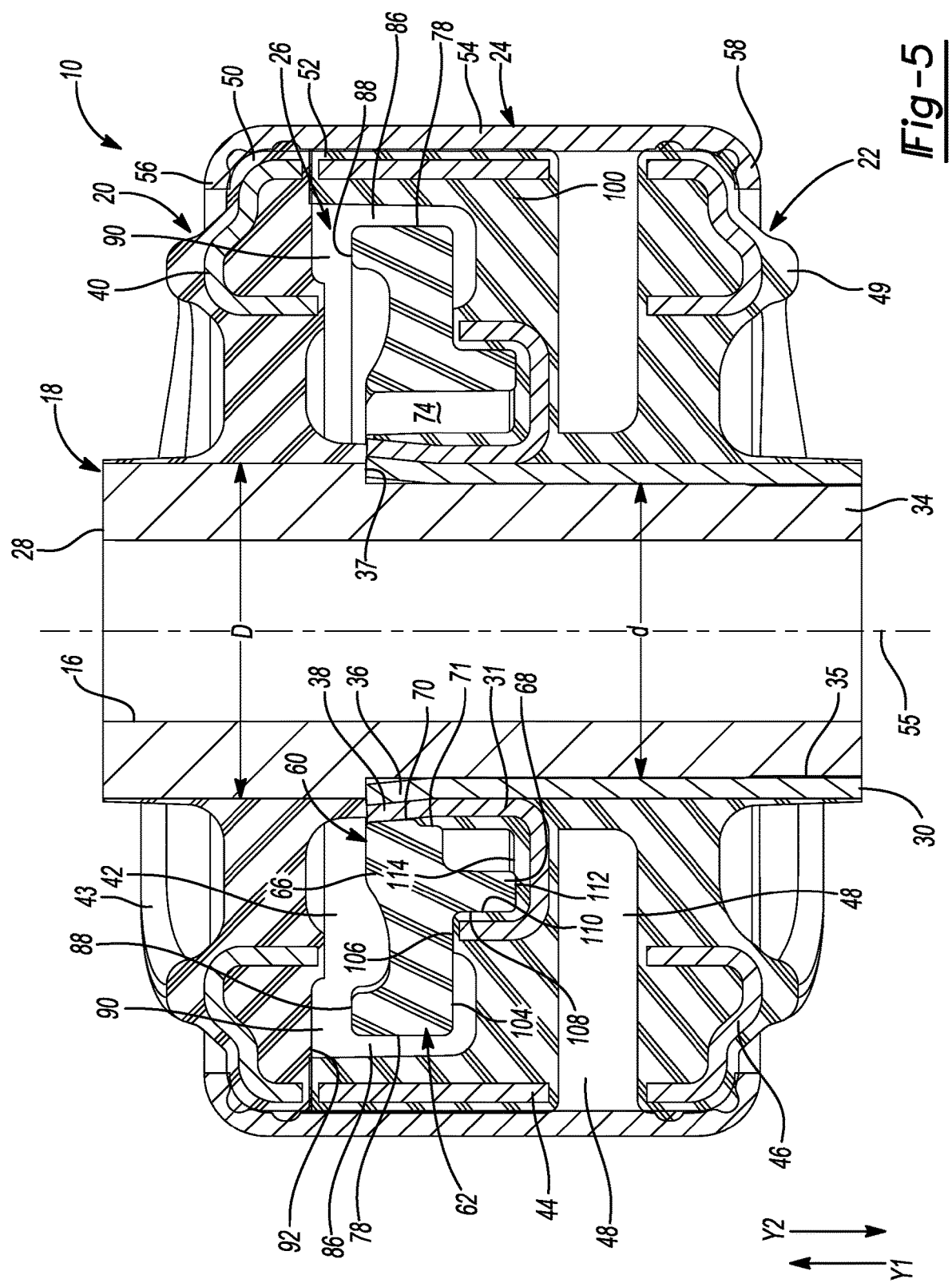
FIG. 5 is yet another cross-sectional view of the hydraulic mount of FIG. 2.

For simplicity and clarity, only one hydraulic mount 10 will be described in detail. Hydraulic mount 10 may include an inner tubular assembly 18, first and second elastomeric bodies 20, 22, a cylindrically-shaped outer housing 24 and a fluid-track 26. The inner tubular assembly 18 may include an inner tubular member 28, a post 30 and an inner ring 31. The inner tubular member 28 may be made out of a metallic material (e.g., steel) and may define the opening 16 extending therethrough that is adapted to receive the fastener 15. The inner tubular member 28 may be attached (e.g., press-fit) to the first elastomeric body 20 and the post 30 to couple the first and second elastomeric bodies 20, 22 to each other. The inner tubular member 28 may include an upper portion 32 and a lower portion 34. As shown in FIGS. 3-5, the first elastomeric body 20 may be disposed around the upper portion 32 and the second elastomeric body 22 may be disposed around the lower portion 34. The upper portion 32 may have a larger outer diameter D than an outer diameter d of the lower portion 34.

The cylindrically-shaped post 30 may be made of a metallic material (e.g., steel) and may be fixedly coupled to the lower portion 34 of the inner tubular member 28. For example, the lower portion 34 of the inner tubular member 28 may be press-fit into the post 30 along a zone 35. In this way, the inner tubular member 28 and the post 30 move together as one piece. An upper end 36 of the post 30 is positioned in engagement with an annular surface 37 of the inner tubular member 28.

The inner ring 31 may be made of a metallic material (e.g., steel) and may have a generally J-shaped cross-section. The inner ring 31 may be attached to the upper end 36 of the post 30. For example, the inner ring 31 may be press-fit onto the upper end 36 of the post 30. In this way, the inner tubular member 28, the post 30 and the inner ring 31 move together as one piece. For example, if the inner tubular member 28 moves in the axial direction, then the post 30 and the inner ring 31 will move in the axial direction along with the inner tubular member 28. Similarly, if the inner tubular member 28 moves in a radial direction, then the post 30 and the inner ring 31 will move in the radial direction along with the inner tubular member 28. As shown in FIGS. 3-5, ends 36, 38 of the post 30 and the inner ring 31, respectively, are flared, thereby strengthening the attachment of the post 30 and the inner ring 31 with each other.

The first elastomeric body 20 may be bonded to and molded around an upper ring 40. The upper ring 40 may have a generally U-shaped or possibly J-shaped cross-section and may be made of a metallic material (e.g., steel). The upper ring 40 supports the first elastomeric body 20 when shear and/or compressive forces are exerted by the vehicle components.

The first elastomeric body 20 may also be bonded to and molded around the upper portion 32 of the inner tubular member 28. The first elastomeric body 20 may also be disposed between the outer housing 24 and the inner tubular member 28. The first elastomeric body 20 may cooperate with the second elastomeric body 22 to define an upper fluid chamber 42.

As shown in FIGS. 2-6, an annularly-shaped projection 43 may extend upwardly from an upper end of the first elastomeric body 20 and past the outer housing 24. The projection 43 may be configured to contact the second vehicle component 14, thereby limiting or restricting any movement of the mount 10 (e.g., the first and second elastomeric bodies 20, 22 and/or the outer housing 24) in a first axial direction Y1. For example, axial loads experienced by the mount 10 and/or vehicle components (e.g., the first and second vehicle components 12, 14) may cause the mount 10 to move in the first axial direction Y1. By limiting or restricting movement of the mount 10 in the first axial direction Y1, damage to the mount 10 and/or vehicle components are prevented.

The second elastomeric body 22 may be bonded to and molded around a first outer ring 44 and a second outer ring 46. The first and second outer rings 44, 46 may provide structural support to the second elastomeric body 22. The first outer ring 44 may be made of a metallic material (e.g., aluminum) and the second outer ring 46 may also be made of a metallic material (e.g., steel). The second outer ring 46 may have a J-shaped cross-section. In some configurations, the first and second outer rings 44, 46 may be a single piece as opposed to two separate pieces.

The second elastomeric body 22 may also be bonded to and molded around the inner ring 31 and the post 30. The second elastomeric body 22 may be positioned below the first elastomeric body 20. The second elastomeric body 22 may be disposed between the outer housing 24 and the post 30. The second elastomeric body 22 may define a lower fluid chamber 48 and may cooperate with the first elastomeric body 20 to define the upper fluid chamber 42. The lower fluid chamber 48 and the upper fluid chamber 42 may communicate by way of the fluid-track 26.

As shown in FIGS. 3-5, an annularly-shaped projection 49 may extend downwardly from a lower end of the first elastomeric body 20 and past the outer housing 24. The projection 49 may be configured to contact a third vehicle component (not shown), thereby limiting or restricting any movement of the mount 10 (e.g., the first and second elastomeric bodies 20, 22 and/or the outer housing 24) in a second axial direction Y2. For example, axial loads experienced by the mount 10 and/or the vehicle components (e.g., the first vehicle component 12, the second vehicle components 14 and/or the third vehicle component (not shown)) may cause the mount 10 to move in the second axial direction Y2. By limiting or restricting movement of the mount 10 in the second axial direction Y2, damage to the mount 10 and/or the vehicle components are prevented.

The cylindrically-shaped outer housing 24 may be made of a metallic material (e.g., aluminum) and may be press-fit onto the first and second elastomeric bodies 20, 22 such that the outer housing 24 houses the inner tubular member 28, the first and second elastomeric bodies 20, 22 and the fluid-track 26. The outer housing 24 may also be press-fit onto the first and second elastomeric bodies 20, 22 such that the upper ring 40 supports the first elastomeric body 20 and the first and second outer rings 44, 46 support the second elastomeric body 22. In this way, the outer housing 24, the first and second outer rings 44, 46 and the upper ring 40 move together as one piece. When the outer housing 24 is press-fit onto the first and second elastomeric bodies 20, 22, an outer portion 50 of the first elastomeric body 20 acts as a buffer between the upper ring 40 and the outer housing 24, and an outer portion 52 of the second elastomeric body 22 acts as a buffer between the first and second outer rings 44, 46 and the outer housing 24. The outer housing 24 may also be attached to the first vehicle component 12. For example, the outer housing 24 may be press-fit into the opening 11 of the first vehicle component 12.

The outer housing 24 may include a body 54 and first and second flanges 56, 58. The first flange 56 may extend radially inwardly (i.e., perpendicularly to a central axis 55 of the inner tubular member 28) from an upper end of the body 54 such that the first flange 56 extends over a periphery of the first elastomeric body 20. The second flange 58 may extend radially inwardly (i.e., perpendicularly to the central axis 55 of the inner tubular member 28) from a lower end of the body 54 such that the second flange 58 extends over a periphery of the second elastomeric body 22. In this way, the first and second flanges 56, 58 cooperate to restrict movement of the first and second elastomeric bodies 20, 22 in the axial direction.

The fluid-track 26 may be made of a polymeric material, for example, and may be attached to the inner ring 31. For example, the fluid-track 26 may be press-fit onto the end 38 of the inner ring 31. In this way, the inner tubular member 28, the post 30, the inner ring 31 and the fluid-track 26 move together as one piece. For example, if the inner tubular member 28 moves in the axial direction, then the post 30, the inner ring 31 and the fluid-track 26 will move in the axial direction along with the inner tubular member 28. Similarly, if the inner tubular member 28 moves in the radial direction, then the post 30, the inner ring 31 and the fluid-track 26 will move in the radial direction along with the inner tubular member 28. The fluid-track 26 is also attached to the inner ring 31 such that the fluid-track 26 is at least partially disposed within the inner ring 31 and at least partially disposed within the upper fluid chamber 42. The fluid-track 26 may provide fluid communication between the lower fluid chamber 48 and the upper fluid chamber 42.

The fluid-track 26 may be asymmetrical and may include a central portion 60, a peripheral portion 62 and a flexible catch 64. The central portion 60 includes a stepped opening 65 as well as an upper end 66 and a lower end 68. Stepped opening 65 is in receipt of the ends 36, 38 of the post 30 and the inner ring 31, respectively. Stepped opening 65 includes an inner cylindrical surface 70 and a larger diameter cylindrical surface 71. Inner surface 70 may contact the end 38 of the inner ring 31. Surface 71 engages a portion of the second elastomeric body 22 positioned between it and the end 38 of the inner ring 31. The upper end 66 may be disposed within the upper fluid chamber 42 and the lower end 68 may be disposed within the inner ring 31.

Figure 7:
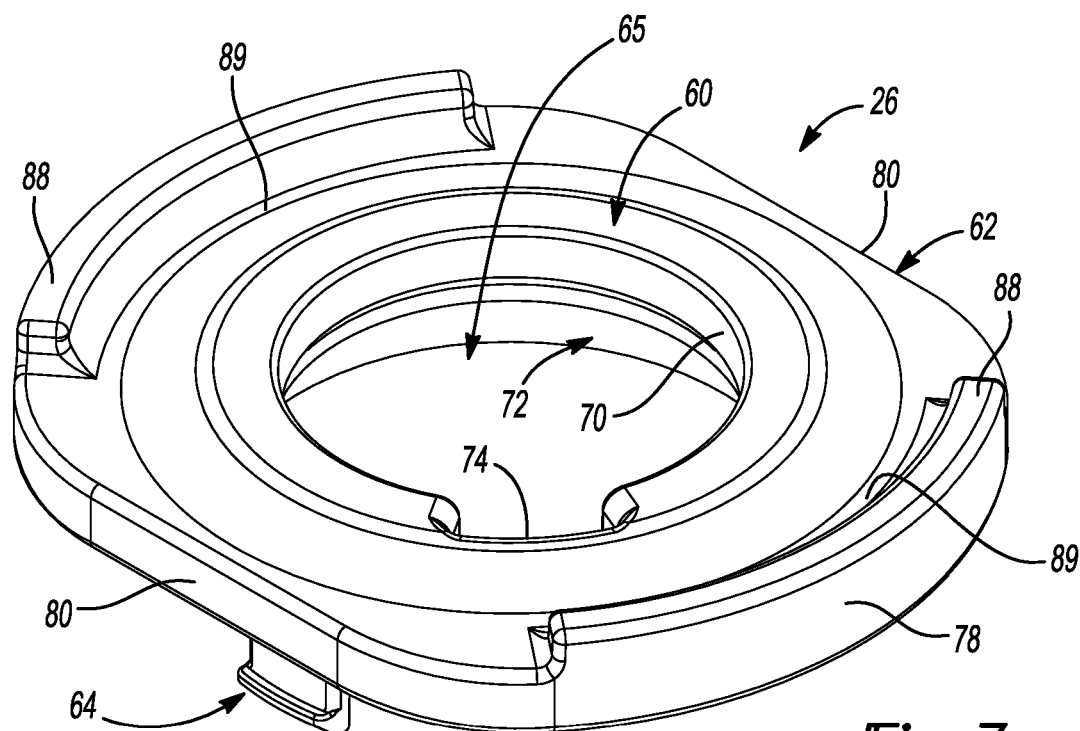
FIG. 7 is a perceptive view of a fluid-track of the hydraulic mount.
Figure 8:
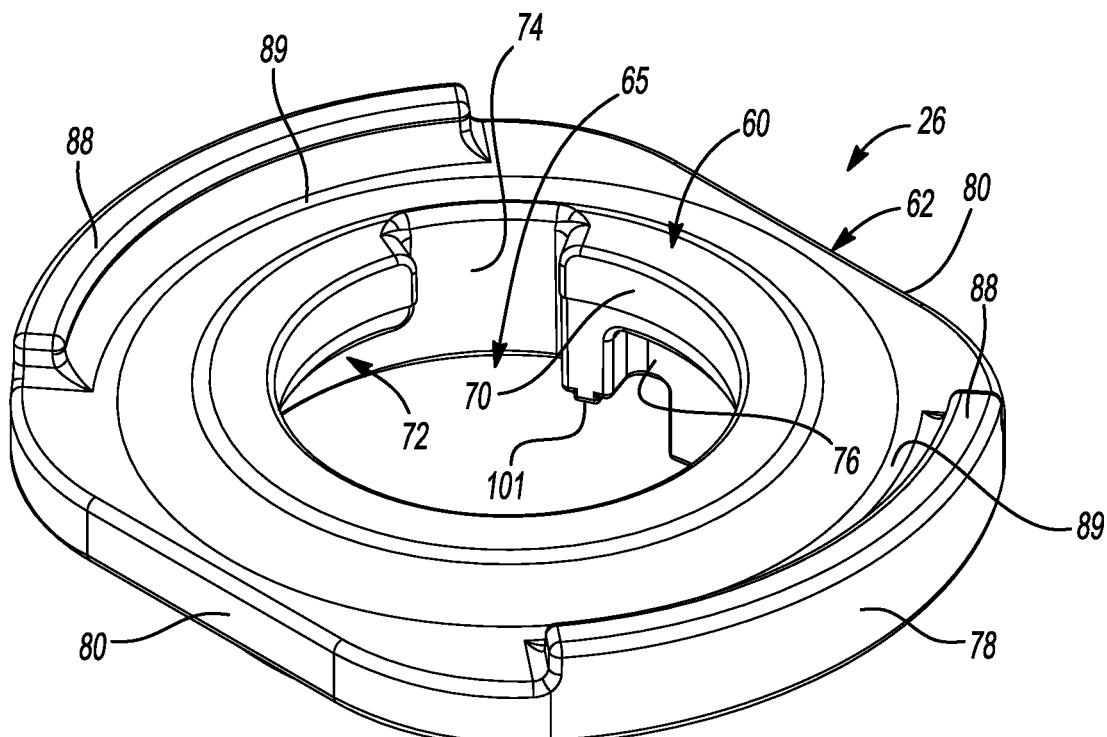
FIG. 8 is another perspective view of the fluid-track of the hydraulic mount.
Figure 9:
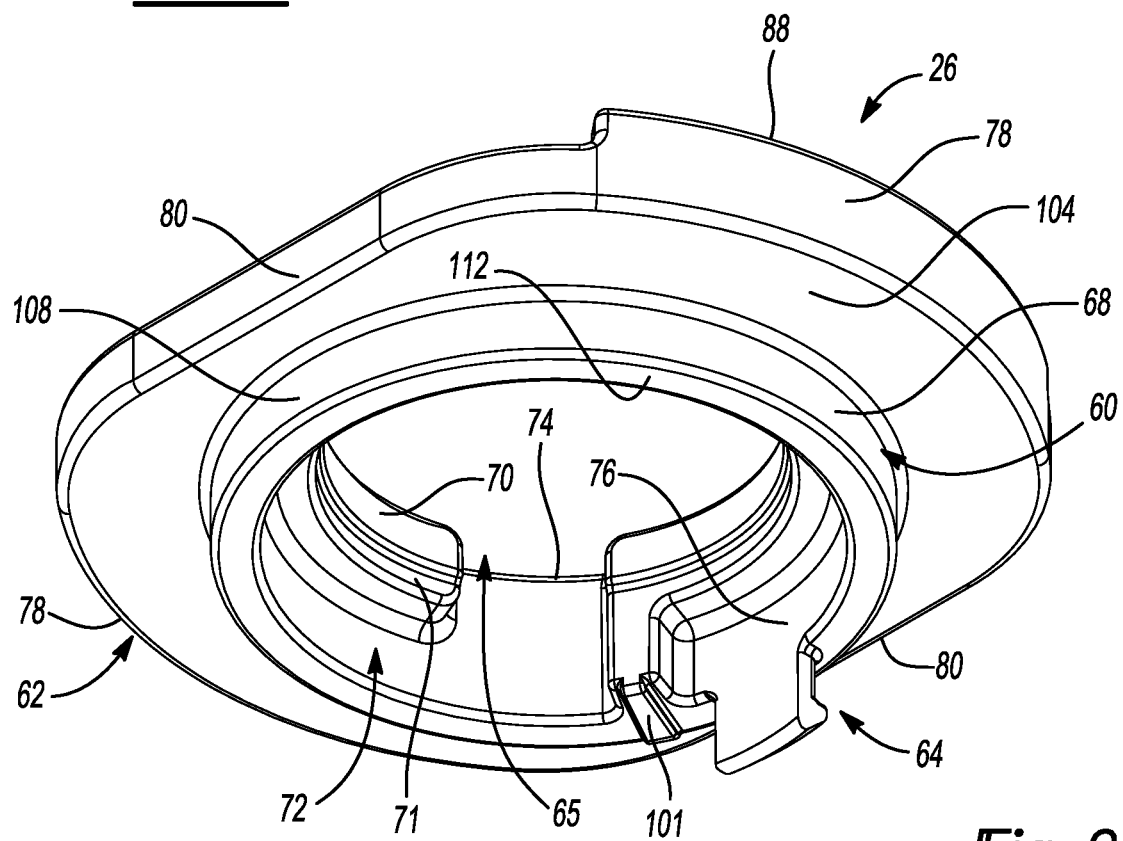
FIG. 9 is yet another perspective view of the fluid-track of the hydraulic mount.

As shown in FIGS. 7-9, a circumferentially extending passage 72 may be formed adjacent inner surface 70. The passage 72 may be in fluid communication with the upper fluid chamber 42 via an opening 74 formed at the upper end 66. The passage 72 may also be in fluid communication with the lower fluid chamber 48 via an opening 76 formed at the lower end 68. In this way, fluid sealed within the mount 10 may flow between the upper fluid chamber 42 and the lower fluid chamber 48 via the passage 72.

The mount 10 may dampen vibrations by way of the fluid-track 26. That is, as vehicle components move (e.g., the first and second vehicle components 12, 14), the mount 10 deflects, thereby compressing and/or extending the first elastomeric body 20. The first elastomeric body 20 may absorb some of the load transmitted by the vehicle components. The mount 10 can be adapted to dampen vibrations at a predetermined frequency for varying amplitudes. In particular, as the mount 10 compresses and/or extends, one of the upper fluid chamber 42 or the lower fluid chamber 48 is raised to a higher pressure than other of the upper fluid chamber 42 or the lower fluid chamber 48. As a result, fluid is pushed from the higher pressure fluid chamber to the lower pressure fluid chamber via the passage 72. It should be understood that the opening 76 may be in fluid communication with openings 79, 81 (FIG. 4) defined in the inner ring 31 and the second elastomeric body 22, respectively, to provide access to the lower fluid chamber 48.

The peripheral portion 62 may extend around and radially outwardly from a periphery of the upper end 66 of the central portion 60 and may include a first set of opposing side walls 78 and a second set of opposing side walls 80. As shown in FIGS. 7-9, the first set of opposing side walls 78 may be curved and the second set of opposing side walls 80 may be straight. The first set of opposing side walls 78 may be 90 degrees relative to the second set of opposing side walls 80. The first set of opposing side walls 78 may extend at a greater radial extent than the second set of opposing side walls 80. A gap 82 may be positioned between the second set of opposing side walls 80 and an inner wall 84 of the second elastomeric body 22 (FIG. 4). The gap 82 may be wider than a gap 86 positioned between the first set of opposing side walls 78 and the inner wall 84 of the second elastomeric body 22 (FIGS. 3 and 5).

The first set of opposing side walls 78 may limit or restrict any movement of the fluid-track 26, the inner tubular member 28, the post 30 and the inner ring 31 in a first radial direction X1 by the width of the gap 86. For example, the fluid-track 26 may be attached to the inner ring 31 such that the first set of opposing side walls 78 extend in the first radial direction X1. The mount 10 may experience higher radial loads in the first radial direction X1 than in a second radial direction X2, for example, in which the second set of opposing side walls 80 extend. The second radial direction X2 may be perpendicular or 90 degrees relative to the first radial direction X1. When the mount 10 experiences a radial load, the radial load may cause the fluid-track 26, the inner tubular member 28, the post 30 and the inner ring 31 to move in the first radial direction X1. When the fluid-track 26, the inner tubular member 28, the post 30 and the inner ring 31 move in the first radial direction X1, one of the side walls 78 of the first set of opposing side walls 78 is configured to contact the inner wall 84 of the second elastomeric body 22, thereby limiting or restricting movement of the fluid-track 26, the inner tubular member 28, the post 30 and the inner ring 31 in the first radial direction X1 by the distance of the gap 86. By limiting or restricting movement of the fluid-track 26, the inner tubular member 28, the post 30 and the inner ring 31 in the first radial direction X1 by the distance of the gap 86, damage to the mount 10 and/or the first and second vehicle components 12, 14 are prevented.

A pair of elongated protrusions 88 may extend upwardly from a surface 89 of the peripheral portion 62 at opposing sides thereof. The pair of elongated protrusions 88 may also extend along the opposing sides of the peripheral portion 62 adjacent respective side walls 78 of the first set of opposing side walls 78. A gap 90 may be positioned between the protrusions 88 and an upper wall 92 of the first elastomeric body 20 (FIGS. 3 and 5). The pair of protrusions 88 may limit or restrict the movement of the fluid-track 26, the inner tubular member 28, the post 30 and the inner ring 31 in the first axial direction Y1 by the distance of the gap 90. For example, the fluid-track 26 may be attached to the inner ring 31 such that the pair of protrusions 88 extend in the first axial direction Y1. The mount 10 may experience an axial load in the first axial direction Y1. When the mount 10 experiences an axial load in the first axial direction Y1, the axial load may cause the fluid-track 26, the inner tubular member 28, the post 30 and the inner ring 31 to move in the first axial direction Y1. When the fluid-track 26, the inner tubular member 28, the post 30 and the inner ring 31 move in the first axial direction Y1, the pair of protrusions 88 are configured to contact the upper wall 92 of the first elastomeric body 20, thereby limiting or restricting movement of the fluid-track 26, the inner tubular member 28, the post 30 and the inner ring 31 in the first axial direction Y1 by the distance of the gap 90. By limiting of restricting movement of the fluid-track 26, the inner tubular member 28, the post 30 and the inner ring 31 in the first axial direction Y1 by the distance of the gap 90, damage to the mount 10 and/or the vehicle components are prevented.

The flexible catch 64 may extend downwardly from the lower end 68 of the central portion 60 and through openings 79, 81 formed in the inner ring 31 and the second elastomeric body 22, respectively. The flexible catch 64 may snap into engagement with the second elastomeric body 22. That is, when the fluid-track 26 is press-fit to the inner ring 31, the flexible catch 64 contacts a bottom surface 98 of an intermediate portion 100 of the second elastomeric body 22 to prevent separation of the fluid-track 26 from the second elastomeric body 22. In this way, the fluid-track 26 is also attached to the second elastomeric body 22.

As shown in FIGS. 8 and 9, a rib 101 may extend downwardly from the lower end 68 of the central portion 60 adjacent to the flexible catch 64 and may create a seal for the fluid-track 26. That is, the rib 101 cooperates with the inner ring 31 to create a seal that prevents fluid in the fluid chambers 42, 48 from flowing from one of the openings 74, 76 directly to the other of the openings 74, 76 (i.e., bypassing the passage 72). Instead, fluid in the fluid chambers 42, 48 must flow from the one of the openings 74, 76 to the other of the openings 74, 76 via the passage 72.

With continued reference to FIGS. 1-9, assembly of the mount 10 will be described in detail. First, the inner ring 31 is press-fit onto the end 36 of the post 30. Next, the first elastomeric body 20 is bonded to and molded around the upper ring 40 and the upper portion 32 of the inner tubular member 28, and the second elastomeric body 22 is bonded to and molded around the first and second outer rings 44, 46, the inner ring 31 and the post 30.

Next, the fluid-track 26 is press-fit onto the end 38 of the inner ring 31 such that the inner surface 70 contacts the end 38 of the inner ring 31 and the surface 71 engages a portion of the second elastomeric body 22 positioned between it and the end 38 of the inner ring 31. When the fluid-track 26 is press-fit onto the end 38 of the inner ring 31, a bottom surface 104 of the peripheral portion 62 is sealingly engaged with an upper annular wall 106 of the intermediate portion 100, an outer cylindrical surface 108 of the central portion 60 is sealingly engaged with a cylindrical wall 110 of the intermediate portion 100 and an end surface 112 of the central portion 60 is sealingly engaged with a lower annular wall 114 of the intermediate portion 100.

Next, the inner tubular member 28 is press-fit into the post 30, thereby coupling the first and second elastomeric bodies 20, 22 to each other. The second elastomeric body 22 defines the lower fluid chamber 48 and cooperates with the first elastomeric body 20 when the first and second elastomeric bodies 20, 22 are coupled to each other to define the upper fluid chamber 42. The lower fluid chamber 48 and the upper fluid chamber 42 are in fluid communication with each other via the passage 72 and the openings 74, 76 of the fluid-track 26. That is, the rib 101 creates a seal between the openings 74, 76 of the fluid-track 26, so fluid in the fluid chambers 42, 48 is prevented from flowing from one of the openings 74, 76 directly to the other of the openings 74, 76 (i.e., bypassing the passage 72). Also, the bottom surface 104 of the peripheral portion 62 being sealingly engaged with the upper annular wall 106 of the intermediate portion 100, the outer cylindrical surface 108 of the central portion 60 being sealingly engaged with the cylindrical wall 110 of the intermediate portion 100, and the end surface 112 of the central portion 60 being sealingly engaged with the lower annular wall 114 of the intermediate portion 100 prevents fluid in one of the fluid chambers 42, 48 from flowing to the other of the fluid chambers 42, 48 and bypassing the openings 74, 76 and the passage 72.

Figure 6:
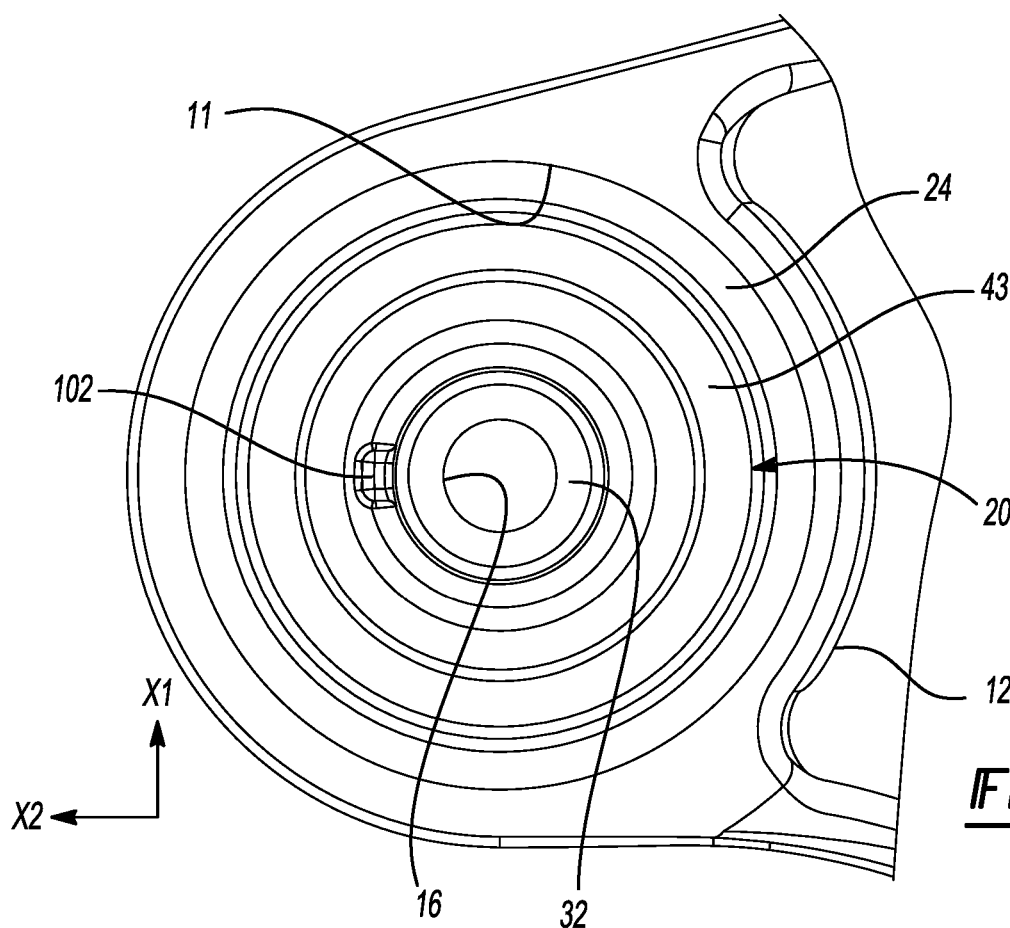
FIG. 6 is a top perspective view of one the hydraulic mounts attached to one of the vehicle components.

Finally, the outer housing 24 is press-fit onto the first and second elastomeric bodies 20, 22. Once the assembly of the mount 10 is completed, the mount 10 is press-fit into the opening 11 of the first vehicle component 12. With reference to FIGS. 4 and 6, lugs 102 may extend from the first and second elastomeric bodies 20, 22 to facilitate positioning of the mount 10 within the opening 11 of the first vehicle component 12. This ensures that the first set of opposing side walls 78 extend in the direction of high radial loads. For example, the lugs 102 may be located 90 degrees from the direction of high radial loads. In this way, when press-fitting the mount 10 within the opening 11 of the first vehicle component 12, the installer knows to position the mount 10 such that the lugs 102 are 90 degrees relative to the direction of high radial loads, which ensures that the first set of opposing sides 78 extend in the direction of high radial loads. It should be understood that the degree in which the lugs 102 may be located relative to the direction of high radial loads may vary.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hydraulic mount for coupling a first vehicle component and a second vehicle component, the hydraulic mount comprising:

an inner tubular assembly;
first and second elastomeric bodies attached to the inner tubular assembly and cooperating with each other to define a first fluid chamber, the second elastomer body also defining a second fluid chamber that is in fluid communication with the first fluid chamber; and
a fluid-track attached to the inner tubular assembly and disposed at least partially in the first fluid chamber, the fluid-track including a central portion, a peripheral portion and a passage, the peripheral portion extending around and radially outwardly from a periphery of the central portion, the passage providing fluid communication between the first and second fluid chambers,
wherein gaps are positioned between the peripheral portion and a wall of one of the first and second elastomeric bodies, the peripheral portion being configured to contact the wall during loading of the inner tubular assembly to restrict movement of the inner tubular assembly and the fluid-track.

2. The mount of claim 1, wherein the peripheral portion includes a first set of opposing side walls and a second set of opposing side walls, and wherein the first set of opposing side walls extends radially outwardly further than the second set of opposing side walls.

3. The mount of claim 2, wherein the load of the inner tubular assembly is a radial load, and wherein one of the side walls of the first set of opposing side walls are configured to contact the wall of the second elastomeric body during the radial load to restrict movement of the inner tubular assembly and the fluid-track in a radial direction.

4. The mount of claim 2, wherein the first set of opposing side walls are curved and the second set of opposing side walls are straight.

5. The mount of claim 4, wherein the wall is an inner wall of the second elastomeric body, and wherein the gaps are positioned between the first set of opposing side walls and the inner wall of the second elastomeric body.

6. The mount of claim 2, wherein the peripheral portion includes a pair of elongated protrusions extending upwardly from a surface of the peripheral portion at opposing sides thereof.

7. The mount of claim 6, wherein the pair of elongated protrusions extend along the opposing sides of the peripheral portion adjacent respective side walls of the first set of opposing side walls.

8. The mount of claim 6, wherein the wall is an upper wall of the first elastomeric body, and wherein the gaps are positioned between the pair of elongated protrusions and the upper wall of the first elastomeric body.

9. The mount of claim 8, wherein the load of the inner tubular assembly is an axial load, and wherein the pair of elongated protrusions are configured to contact the upper wall of the first elastomeric body during the axial load to restrict movement of the inner tubular assembly and the fluid-track in an axial direction.

10. The mount of claim 9, wherein the central portion includes an opening that has an inner surface, the passage is formed adjacent the inner surface.

11. The mount of claim 1, wherein the fluid-track is made of a polymeric material.

12. A hydraulic mount for coupling a first vehicle component and a second vehicle component, the hydraulic mount comprising:
an inner tubular assembly;
first and second elastomeric bodies attached to the inner tubular assembly and cooperating with each other to define a first fluid chamber, the second elastomeric body also defining a second fluid chamber that is in fluid communication with the first fluid chamber; and
a fluid-track disposed at least partially in the first fluid chamber and including a central portion and a peripheral portion, the central portion including an opening that receives the inner tubular assembly, the peripheral portion extending radially outwardly from a periphery of the central portion, wherein the opening includes a first inner surface and a second inner surface, the first inner surface contacting an inner ring and the second inner surface engaging a portion of the second elastomeric body positioned between it and the inner ring,
wherein the central portion includes a passage providing fluid communication between the first and second fluid chambers.

13. The mount of claim 12, wherein the inner tubular assembly includes a post and the inner ring, and wherein the inner ring is attached to an end of the post and the fluid-track is attached to an end of the inner ring.

14. The mount of claim 13, wherein the ends of the post and the inner ring, respectively, are flared to strengthen the attachment between the post and the inner ring.

15. The mount of claim 12, wherein the fluid-track is made of a polymeric material.

16. A hydraulic mount for coupling a first vehicle component and a second vehicle component, the hydraulic mount comprising:
an inner tubular assembly;
first and second elastomeric bodies attached to the inner tubular assembly and cooperating with each other to define a first fluid chamber, the second elastomeric body also defining a second fluid chamber that is in fluid communication with the first fluid chamber; and
a fluid-track disposed at least partially in the first fluid chamber and including a central portion and a peripheral portion, the central portion including an opening that receives the inner tubular assembly, the peripheral portion extending radially outwardly from a periphery of the central portion,
wherein the central portion includes a passage providing fluid communication between the first and second fluid chambers,
wherein the fluid-track includes a flexible catch that extends downwardly from the central portion and through first and second openings formed in an inner ring and the second elastomeric body, respectively, the flexible catch including a radially outwardly extending portion that snaps into engagement with the second elastomeric body.

17. The mount of claim 16, wherein gaps are positioned between the peripheral portion and a wall of one of the first and second elastomeric bodies, and wherein the peripheral portion is configured to contact the wall during loading of the inner tubular assembly to restrict movement of the inner tubular assembly and the fluid-track.

18. A method comprising:
molding a first elastomeric body around an inner tubular member;
molding a second elastomeric body around an inner ring and a post;
attaching an asymmetrical fluid-track to the inner ring;
attaching the inner tubular member to the post to couple the first and second elastomeric bodies, the first and second elastomeric bodies cooperating to define a first fluid chamber, the second elastomeric body also defining a second fluid chamber that is in fluid communication with the first fluid chamber via the asymmetrical fluid-track;

press-fitting an outer housing onto the first and second elastomeric bodies; and press-fitting the outer housing into a vehicle component, wherein at least one of the first and second elastomeric bodies includes an elastomeric lug to facilitate orientation of the asymmetrical fluid-track relative to the vehicle component prior to press-fitting the outer housing into the vehicle component.

19. The method of claim 18, wherein attaching the fluid-track to the inner ring includes press-fitting the fluid-track onto the inner ring.

* * * * *